United States Patent Office 3,406,159
Patented Oct. 15, 1968

3,406,159
METHOD FOR THE MANUFACTURE OF POLY-
FUNCTIONAL DIAZONIUM PHOSPHATES
Hartmut Steppan, Wiesbaden-Dotzheim, and August
Rebenstock and Wilhelm Neugebauer, Wiesbaden-
Biebrich, Germany, assignors, by mesne assign-
ments, to Azoplate Corporation, Murray Hill, N.J.,
a corporation of New Jersey
No Drawing. Filed July 18, 1961, Ser. No. 124,777
Claims priority, application Germany, Jan. 25, 1961,
K 42,720
20 Claims. (Cl. 260—141)

This invention relates to a method for recovering condensation products of substituted or unsubstituted diphenylamine-4-diazonium salts with formaldehyde. The condensation products, which are polyfunctional diazonium salts, are obtained as phosphates free of metal salts.

It is known to the art to prepare polyfunctional diazonium salts by condensing diphenylamine-4-diazonium salts with carbonyl compounds in the presence of mineral acids. In most instances, condensation of diazonium salts with formaldehyde is effected in sulfuric acid of high concentration; hydrochloric acid has also been used as a condensation medium. Isolation of the products produced by condensation in sulfuric acid is accomplished according to a variety of methods, e.g. by precipitation as zinc chloride double salt, as an acid sulfate, or as a diazo sulfonate. The isolation of the condensation products produced in hydrochloric acid has not been specifically described.

The foregoing methods of isolation of the diazonium condensation products limit the technical application of these compounds considerably.

In accordance with the present invention a method is provided for recovering the condensation products of substituted or unsubstituted diphenylamine-4-diazonium salts with formaldehyde in which the condensation products, which are polyfunctional diazonium salts, are obtained as phosphates free of metal salts. In this method, substituted or unsubstituted diphenylamine-4-diazonium salts of acids having a boiling point below 150° C., are condensed with formaldehyde in a phosphoric acid condensation medium. Either before or after the condensation, the anions of the original diphenylamine-4-diazonium salts are removed from the reaction mixture. The polyfunctional diazonium phosphates thus formed are precipitated from the reaction mixture, if necessary, after dilution thereof, by means of organic solvents, in which the phosphates are either insoluble or difficultly soluble, after which the diazonium phosphates are separated by filtration and dried.

It is not necessary, in order to obtain the polyfunctional diphenylamine-4-diazonium phosphates of the invention, to effect the actual condensation of the diazonium salt with formaldehyde in phosphoric acid. In a variation of the method of the invention, the polyfunctional diazonium salts of acids having a boiling point below 150° C. obtained by condensation of diphenylamine-4-diazonium salts with formaldehyde, are dissolved in phosphoric acid and the anions of the dissolved polyfunctional diazonium salts are removed from the solution whereupon, if necessary after dilution of the solution, the polyfunctional diazonium phosphates formed are precipitated by the addition of organic solvents in which the phosphates are either insoluble or difficultly soluble and the products are then filtered and dried.

The polyfunctional diazonium salts, which are obtained as solids in accordance with the invention, are acid phosphates. Neutral phosphates are obtained therefrom by treating solutions thereof in water with an anion exchanger. Upon evaporation of the filtered solution, the neutral phosphates corresponding to the acid polyfunctional diazonium phosphates are isolated.

If condensation is effected in phosphoric acid, it is of advantage to pass a dry stream of gas, either before or after the condensation reaction, through the reaction solution. By this treatment, the volatile acid corresponding to the diphenylamine-4-diazonium salt anion is removed and there remains a solution of the diphenylamine-4-diazoniumphosphate in phosphoric acid, which is then condensed with formaldehyde. On the other hand, if the condensation is effected before the treatment to remove the anions, a solution of the phosphate of the condensation product in phosphoric acid is obtained directly. From these solutions, the condensation products are isolated as acid phosphates having a composition corresponding to the general formula $ArN_2H_2PO_4 \cdot H_3PO_4$, in which Ar is a condensed diphenylamine unit. Isolation is accomplished by the addition of organic solvents, the product being obtained in good yield. The acid phosphates are obtained in a less pure state and in a poorer yield if isolated with organic solvents before removal of the anions contained in the original diazonium salt.

As noted above, condensation does not necessarily have to be effected in the presence of phosphoric acid. It is possible to condense a diphenylamine-4-diazonium complex with formaldehyde in other acids, dissolve the condensation products obtained as salts, the anions of which are those of acids having a boiling point below 150° C., in phosphoric acid, remove the volatile acid, e.g. by passing a stream of dry gas through the reaction medium, and isolate the acid phosphates of the condensation products by adding to the mixture of the reaction products organic solvents in which the phosphates are either insoluble or difficultly soluble.

It is advantageous to remove the volatile acid by passing a stream of dry air through the reaction medium at a slightly elevated temperature under a slight vacuum. If hydrobromic acid is to be removed, it is recommended to first add some polyphosphoric acid to the solution of the condensation product in 85% phosphoric acid and then begin to pass the air stream through the mixture. The added polyphosphoric acid diminishes the water content of the phosphoric acid and, thus, the hydration of hydrobromic acid, thereby allowing an easy and complete removal of the hydrobromic acid.

In order to isolate the acid phosphates from the viscous condensation mixtures, they are blended with an organic solvent in which the acid phosphate of the condensation product is insoluble or difficultly soluble but in which water and phosphoric acid are easily soluble. However, it is more desirable to dilute the viscous condensation mixture with a suitable solvent, e.g. dimethylformamide or dimethylsulfoxide, preferably however, with methanol, and to introduce the dilute solution thus obtained in the form of a thin stream, while vigorously stirring and, if desired, at a slightly elevated temperature, into a large quantity of an organic solvent which easily dissolves water and phosphoric acid, but in which the acid phosphate is either insoluble or difficultly soluble. Lower molecular weight alcohols and ketones, preferably ethanol, isopropanol and acetone, have been found to be suitable solvents for precipitating the acid phosphates. Finely divided amorphous precipitates are obtained which are free of resinous contaminations. Upon stirring at a slightly elevated temperature, preferably 25 to 40° C., the precipitates are converted into yellow-orange colored, sandy, easily filterable products which, upon drying, are converted into free flowing sandy powders. The acid phosphates thus obtained are thermally very stable, have a good shelf life and can be easily shipped. They are very soluble in water and easily soluble in mixtures of water and water-miscible solvents.

The neutral phosphates $ArN_2H_2PO_4$ are prepared by neutralizing solutions of the acid phosphates $$ArN_2H_2PO_4 \cdot H_3PO_4$$

preferably with weakly alkaline anion exchangers, and evaporating the neutral solutions to dryness under vacuum. The neutral salts have a solubility similar to that of the acid phosphates but have, however, a lower thermal stability.

Depending upon the acid used for condensation, the degree of condensation of the product will vary. A qualitative evaluation of the degree of condensation is obtained by means of paper chromatography (Schleicher and Schüll 2043b; butanol/glacial acetic acid/water 40:10:50). The higher the degree of condensation, the smaller the $R_f$ value. For instance, products with considerably lower degree of condensation are obtained in hydrohalide acids and in phosphoric acids, than e.g. in concentrated sulfuric acid. It is accordingly possible to prepare by means of this invention phosphates of condensation products of varying degrees of condensation.

The products prepared according to this invention are useful, for example, as dyestuff intermediates.

In the following, a number of diphenylamine-4-diazonium salts is mentioned by way of example, which may be condensed with formaldehyde or its polymers in the presence of phosphoric acid or another mineral acid and then converted into polyfunctional diphenylamine-diazonium phosphates according to the method of the present invention. It is expressly stated that the process of the present invention is not limited to the compounds stated.

Diphenylamine-4-diazonium chloride,
Diphenylamine-4-diazonium bromide,
Diphenylamine-4-diazonium sulfate,
3-methoxy-diphenylamine-4-diazonium sulfate,
3-methoxy-diphenylamine-4-diazonium chloride,
3-methoxy-diphenylamine-4-diazonium bromide,
3-ethoxy-diphenylamine-4-diazonium chloride,
3-ethoxy-diphenylamine-4-diazonium bromide,
3-ethoxy-diphenylamine-4-diazonium sulfate,
2-methoxy-diphenylamine-4-diazonium chloride,
2-methoxy-diphenylamine-4-diazonium sulfate,
2-methoxy-diphenylamine-4'-diazonium sulfate,
2-methoxy-diphenylamine-4'-diazonium chloride,
4-methoxy-diphenylamine-4'-diazonium sulfate,
4-methoxy-diphenylamine-4'-diazonium chloride,
4-methyl-diphenylamine-4'-diazonium chloride,
4-methyl-diphenylamine-4'-diazonium sulfate,
3-methyl-diphenylamine-4'-diazonium chloride,
3-methyl-diphenylamine-4'-diazonium sulfate,
3-methyl-diphenylamine-4-diazonium chloride,
3-methyl-diphenylamine-4-diazonium sulfate,
3-ethyl-diphenylamine-4-diazonium chloride,
3-methyl-6-methoxy-diphenylamine-4'-diazonium chloride,
3,3'-dimethyl-diphenylamine-4'-diazonium chloride,
3-methyl-6-methoxy-diphenylamine-4-diazonium chloride,
2-methyl-5-chloro-diphenylamine-4'-diazonium sulfate,
3-chloro-diphenylamine-4'-diazonium sulfate,
Diphenylamine-4-diazonium chloride-2'-carboxylic acid,
Diphenylamine-4-diazonium chloride-2-carboxylic acid,
3-isopropyloxy-diphenylamine-4-diazonium chloride,
4-n-butyloxy-diphenylamine-4'-diazonium chloride,
2,5-diethoxy-diphenylamine-4-diazonium chloride,
4-methoxy-2'-ethoxy-diphenylamine-4'-diazonium chloride,
3-isoamyloxy-diphenylamine-4-diazonium chloride,
4,3-dimethoxy-diphenylamine-4'-diazonium chloride,
2-n-propyloxy-diphenylamine-4'-diazonium chloride,
2-n-butyloxy-diphenylamine-4'-diazonium chloride.

The invention will be further illustrated by reference to the following specific examples:

Example I

To 4.8 parts by volume of 85% phosphoric acid, 0.63 part by weight of paraformaldehyde and 5 parts by weight of 3-methoxy-diphenylamine-4-diazonium chloride are successively added, while stirring, and the reaction mixture is then stirred for an additional 40 hours at a temperature of 40° C. The mixture is then cooled and, after the addition of 5 parts by volume of 85% phosphoric acid, the chloride ions are removed therefrom by passing a dry stream of air through the reaction mixture until no additional chloride ions can be detected. Then, 2.5 parts by volume of 85% phosphoric acid and 40 parts by volume of methanol are added and the diluted mixture is passed, while vigorously stirring, into 170 parts by volume of isopropanol. This mixture is then heated to a temperature of 50° C. and stirred until the precipitate is converted into a form which can be easily filtered. The precipitate is then separated from the solvent by vacuum filtration, resuspended in 50 parts by volume of isopropanol, refiltered and dried. The yield is 7.2 parts by weight of the acid phosphate of the condensation product.

Example II

To 15.2 parts by volume of 85% phosphoric acid, 2.02 parts by weight of paraformaldehyde and 14.2 parts by weight of diphenylamine-4-diazonium chloride are successively added. The mixture is stirred for 24 hours at a temperature of 40° C. and is then diluted with 10 parts by volume of 85% phosphoric acid. Chloride ions are removed from the mixture by passing a dry stream of air therethrough. The mixture is then diluted with 100 parts by volume of methanol and poured, while vigorously stirring, into 600 parts by volume of isopropanol. This mixture is then heated, while stirring, to 35 to 40° C. until the precipitate has the form of a sandy powder which is then removed from the solvents by filtration, resuspended in 300 parts by volume of isopropanol, refiltered and dried. The yield obtained is 20.2 parts by weight of the acid phosphate of the condensation product.

In order to obtain a neutral phosphate of the condensation product of the diphenylamine-4-diazonium salt and paraformaldehyde described above, the following procedure is used:

10 parts by weight of the acid phosphate of the condensation product of diphenylamine-4-diazonium chloride and paraformaldehyde, prepared according to the above procedure, are dissolved in 40 parts by volume of water. The solution is then treated with an anion exchanger until it is neutral. For example, 15 parts by weight of the ion exchanger II may be added and the solution vigorously stirred for about 15 minutes until a change in the pH value from 3 to 6 occurs. The ion exchanger is then removed from the solution by filtration and the filtrate is evaporated to dryness under vacuum. The yield is 6.7 parts by weight of the neutral phosphate of the condensation product.

Example III

In 30 parts by volume of 85% phosphoric acid are dissolved 15 parts by weight of the chloride of a condensation product, which was made by condensing 46 parts by weight of diphenylamine-4-diazonium chloride with 6 parts by weight of formaldehyde in hydrochloric acid and evaporation of the condensation mixture. A dry stream of air is passed through the solution until no further chloride can be detected. The solution is then diluted with 160 parts by volume of methanol and poured into 650 parts by volume of isopropanol, while vigorously stirring. The mixture, from which a precipitate separates, is then heated to 40° C., while stirring, until the precipitate becomes sandy. The precipitate is then filtered off from the solvent, suspended in acetone, refiltered and dried under vacuum. The yield is 16.2 parts by weight of the acid phosphate of the condensation product.

Example IV

In 10 parts by volume of 100% phosphoric acid are dissolved 5 parts by weight of an acid bromide obtained by condensing 138 parts by weight of diphenylamine-4-diazonium chloride and 18 parts by weight of formaldehyde in 66% hydrobromic acid and evaporating the reaction mixture to dryness. After passing a dry stream of air through the solution, 7 parts by volume of polyphosphoric acid (76% $P_2O_5$) are added to the solution and air is passed through the solution until bromide is no longer detectable therein. The reaction mixture is then diluted with 40 parts by volume of methanol and then poured into 350 parts by volume of isopropanol. The mixture is heated to 40° C. until the precipitate has the form of a sandy powder which is then separated from the solution by filtration, suspended in a small amount of acetone, refiltered and dried at 40° C. under vacuum. The yield obtained is 4 parts by weight of the acid phosphate of the condensation product.

Example V

In 24 parts by volume of 85% phosphoric acid are dissolved 8 parts by weight of the chloride of a condensation product obtained by condensing 23 parts by weight of diphenylamine-4-diazonium sulfate and 2.4 parts by weight of formaldehyde in 78% sulfuric acid. Further treatment of the solution with a stream of air, for removal of the hydrochloric acid, and isolation of the acid phosphate is effected according to the method described in Example III above. The yield is 7.1 parts by weight of the acid phosphate of the condensation product.

Example VI 5.23 parts by weight of 4-methoxy-diphenylamine-4'-diazonium chloride are dissolved in 20 parts by volume of 85% phosphoric acid. A stream of dry air is conducted through the solution unitil no further chloride can be detected in the solution. Small quantities of the solution, which were sprinkled on the walls of the container, are combined with the main solution by means of 5 parts by volume of phosphoric acid (85%). While stirring, 0.66 part by weight of para-formaldehyde is then added to the solution. After maintaining the reaction mixture for 40 hours at 40° C., it is diluted with 300 parts by volume of methanol and then, while vigorously stirring, poured into 800 parts by volume of isopropanol. The reaction mixture is heated to 40° C. for a short time and the precipitate is then filtered off by suction. The filter cake is suspended in 200 parts by volume of isopropanol, again filtered off by suction and dried at 40° C. The yield is 7.4 parts by weight of the acid phosphate of the condensation product.

Example VIII

For conversion of the chloride of a condensation product into the corresponding acid phosphate, there are dissolved in 12 parts by volume of 97 percent phosphoric acid 3 parts by weight of a condensation product prepared by condensing 20 parts by weight of 4-methyl-diphenylamine-4'-diazonium sulfate with 1.96 parts by weight of paraformaldehyde in 42 parts by volume of 78 percent sulfuric acid and separated in the form of its chloride. A stream of dry air is passed through the mixture at 40° C. until no chloride ions can be detected in the mixture. Subsequently, the mixture is diluted with 32 parts by volume of methanol and then poured into 250 parts by volume of isopropanol. The precipitate which forms is filtered off, washed in isopropanol and acetone, and finally dried under vacuum. The yield is 3.3 parts by weight of the acid phosphate of the condensation product.

Example VIII

For conversion of the chloride of a condensation product into the corresponding acid phosphate, 3.2 parts by weight of 3 - ethoxy-diphenylamine-4-diazoniumchloride (93 percent product) and 0.36 part by weight of formaldehyde are introduced into 3.8 parts by weight of 97 percent phosphoric acid. After heating the reaction mixture for 70 hours at a temperature of 40° C., it is diluted with 20 parts by volume of 97 percent phosphoric acid and a stream of air is passed through until it is free of chloride ions. The solution is diluted with 37 parts by volume of methanol and introduced into 290 parts by volume of isopropanol. The mixture is stirred for 10 minutes at 40° C., cooled down, and the precipitate is filtered off, washed with isopropanol, and dried under vacuum. The yield is 4.3 parts by weight of the acid phosphate of the condensation product.

Example IX 3.9 parts by weight of 3-methyl-diphenylamine-4'-diazoniumchloride and 0.53 part by weight of formaldehyde are condensed, within 24 hours and at a temperature of 40° C., in 4.6 parts by weight of 95 percent phosphoric acid as a condensation medium. After dilution with 18 parts by weight of 95 percent phosphoric acid, a stream of dry air is passed through the mixture until it is free of chloride ions. After processing the mixture as stated in Example 8, 5.9 parts by weight of the acid phosphate of the condensation product are obtained.

The phosphate of a condensation product of 3-methyl-diphenylamine - 4 - diazoniumchloride and paraformaldehyde is obtained by the same procedure.

Example X

The method described in Example I is repeated, but 2-methoxy - diphenylamine - 4'-diazoniumchloride or 2-methoxy - diphenylamine - 4-diazoniumchloride is condensed with paraformaldehyde and the condensation product is converted into the solid acid phosphate.

It will be obvious to those skilled in the art that many modifications may be made within the scope of the present invention without departing from the spirit thereof, and the invention includes all such modifications.

What is claimed is:

1. A process for preparing a polyfunctional diazonium phosphate which comprises condensing a diphenylamine-4-diazonium salt of an acid, the acid having a boiling point below 150° C., with formaldehyde in phosphoric acid solution, removing the anions of the initial diphenylamine-4-diazonium salt from the reaction mixture, precipitating the diazonium phosphate from the reaction mixture, and recovering the diazonium phosphate as a product of the process.

2. A process according to claim 1 in which the anions are removed by passing a dry stream of air through the reaction mixture.

3. A process according to claim 1 in which the reaction mixture is with an organic solvent prior to precipitating the diazonium phosphate.

4. A process according to claim 1 in which the diazonium phosphate is precipitated by the addition of an organic liquid in which the diazonium phosphate is insoluble, and heat is applied until the precipitate separates.

5. A process according to claim 1 in which the diphenylamine-4-diazonium salt is 3-methoxy-diphenylamine-4-diazonium chloride.

6. A process according to claim 1 in which the diphenylamine-4-diazonium salt is diphenylamine-4-diazonium chloride.

7. A process according to claim 1 in which the diphenylamine-4-diazonium salt is 3-ethoxy-diphenylamine-4-diazonium chloride.

8. A process according to claim 1 in which the diphenylamine-4-diazonium salt is 3-methyl-diphenylamine-4-diazonium chloride.

9. A process according to claim 1 in which the diphenylamine-4-diazonium salt is 4-methyl-diphenylamine-4'-diazonium chloride.

10. A process for preparing a polyfunctional diazonium phosphate which comprises treating a phosphoric acid solution of the condensation product of a diphenylamine-4-diazonium salt of an acid with formaldehyde, the acid boiling at a temperature below 150° C., to remove the anions of the initial diphenylamine-4-diazonium salt from the solution, precipitating the diazonium phosphate from the solution, and recovering the diazonium phosphate as a product of the process.

11. A process according to claim 10 in which the anions are removed by passing a dry stream of air through the solution.

12. A process according to claim 10 in which the diazonium phosphate is precipitated by the addition of an organic liquid in which the diazonium phosphate is insoluble, and heat is applied until the precipitate separates.

13. A process for preparing a polyfunctional diazonium phosphate which comprises treating a phosphoric acid solution of a diphenylamine-4-diazonium salt of an acid, the acid having a boiling point below 150° C., to remove the anions therefrom, condensing the treated diazonium salt with formaldehyde, precipitating the diazonium phosphate from the solution, and recovering the diazonium phosphate as a product of the process.

14. A process according to claim 13 in which the anions are removed by passing a dry stream of air through the solution.

15. A process according to claim 13 in which the diazonium phosphate is precipitated by the addition of an organic liquid in which the diazonium phosphate is insoluble, and heat is applied until the precipitate separates.

16. A process for preparing a polyfunctional diazonium phosphate, which comprises passing a dry stream of air through a phosphoric acid solution of the condensation product of formaldehyde with a salt of a compound selected from the group consisting of a diphenylamine-4-diazonium base and the base substituted in at least one of the positions 2, 3, 2', 3', and 4', by a substituent selected from the group consisting of methyl, ethyl, methoxy, ethoxy, propoxy, isopropoxy, butoxy, isoamyloxy, carboxy and chloro, the salt-forming anions of the condensation product being anions of an acid having a boiling point lower than 150° C., to remove the anions of the condensation product from the solution; adding an organic solvent, in which the phosphate of the condensation product is insoluble, to precipitate the acid phosphate of the condensation product of the diphenylamine diazonium compound from the solution; and separating the precipitate from the solution to recover the acid phosphate of the condensation product.

17. A process according to claim 16 in which the anions of the acid having a boiling point lower than 150° C. are selected from the group consisting of chlorine and bromine.

18. A process for preparing a polyfunctional diazonium phosphate which comprises passing a dry stream of air through a phosphoric acid solution of the condensation product of 3-methoxy-diphenylamine-4-diazonium chloride with formaldehyde in phosphoric acid solution to remove chloride ions from the solution; adding isopropanol to precipitate the acid phosphate of the condensation product from the solution; and separating the precipitate from the solution to recover the acid phosphate of the condensation product.

19. A process for preparing a polyfunctional diazonium phosphate, which comprises passing a dry stream of air through a phosphoric acid solution of the condensation product of formaldehyde with a salt of a compound selected from the group consisting of a diphenylamine-4-diazonium base and the base substituted in at least one of the positions 2, 3, 2', 3' and 4', by a substituent selected from the group consisting of methyl, ethyl, methoxy, ethoxy, propoxy, isopropoxy, butoxy, isoamyloxy, carboxy and chloro, the salt-forming anions of the condensation product being anions of an acid having a boiling point lower than 150° C., to remove the anions of the condensation product from the solution; adding methanol to dilute the reaction mixture; pouring the diluted mixture into isopropanol to precipitate the acid phosphate of the condensation product of the diphenylamine diazonium compound from the solution; and separating the precipitate from the solution to recover the acid phosphate of the condensation product.

20. An acid phosphate of a condensation product of formaldehyde with a salt of a compound selected from the group consisting of a diphenylamine-4-diazonium base and the base substituted in at least one of the positions 2, 3, 2', 3', and 4', by a substituent selected from the group consisting of methyl, ethyl, methoxy, ethoxy, propoxy, isopropoxy, butoxy, isoamyloxy, carboxy and chloro, the acid phosphate having the general formula $$ArN_2H_2PO_4 \cdot H_3PO_4$$

in which $ArN_2$ is the diphenylamine-4-diazonium base condensed with formaldehyde.

References Cited

UNITED STATES PATENTS

| | | | |
|---|---|---|---|
| 2,063,631 | 12/1936 | Schmidt | 260—141 |
| 2,679,498 | 5/1954 | Seven et al. | 260—141 |
| 2,060,573 | 11/1936 | Hester | 260—624 |
| 2,238,940 | 4/1941 | Linch et al. | 260—361 XR |
| 2,413,507 | 12/1946 | Lee et al. | 260—363 |
| 2,266,229 | 12/1941 | May | 260—141 |
| 3,050,502 | 8/1962 | Mellan | 260—141 XR |

FOREIGN PATENTS

| | | |
|---|---|---|
| 151,677 | 3/1932 | Switzerland. |
| 604,278 | 10/1934 | Germany. |
| 74,200 | 11/1960 | France. |
| 949,104 | 9/1956 | Germany. |

OTHER REFERENCES

Saunders, "The Aromatic Diazo Compounds" (1949), p. 41.

CHARLES B. PARKER, Primary Examiner.

D. M. PAPUGA, Assistant Examiner.